(12) United States Patent
List et al.

(10) Patent No.: US 9,327,691 B2
(45) Date of Patent: May 3, 2016

(54) TRANSMISSION PARKING LOCK

(71) Applicant: ZF Friedrichshafen AG, Friedrichshafen (DE)

(72) Inventors: Matthias List, Friedrichshafen (DE); Bernd Austermann, Meckenbeuren (DE); Gert Hanker, Meckenbeuren (DE); Stefan Csajagi, Eriskirch (DE); Gerhard Spindler, Langenargen (DE); Berthold Schraff, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/350,898

(22) PCT Filed: Sep. 20, 2012

(86) PCT No.: PCT/EP2012/068527
§ 371 (c)(1),
(2) Date: Apr. 10, 2014

(87) PCT Pub. No.: WO2013/053577
PCT Pub. Date: Apr. 18, 2013

(65) Prior Publication Data
US 2014/0251750 A1    Sep. 11, 2014

(30) Foreign Application Priority Data

Oct. 13, 2011 (DE) .......................... 10 2011 084 392

(51) Int. Cl.
*F16H 63/34* (2006.01)
*B60T 1/12* (2006.01)
(Continued)

(52) U.S. Cl.
CPC . *B60T 1/12* (2013.01); *B60T 1/005* (2013.01); *F16D 63/006* (2013.01); *F16H 63/3416* (2013.01); *F16H 63/3433* (2013.01)

(58) Field of Classification Search
CPC .......................... F16H 63/3416; F16H 63/3433
See application file for complete search history.

(56) References Cited

U.S. PATENT DOCUMENTS 4,719,999 A    1/1988    Ohkubo
4,727,967 A    3/1988    Ogasawara et al.
(Continued)

FOREIGN PATENT DOCUMENTS

DE    199 33 618       1/2001
DE    10 2006 053318   6/2007
(Continued)

OTHER PUBLICATIONS

German Patent Office Search Report, Jul. 6, 2012.
(Continued)

*Primary Examiner* — Mark Manley
(74) *Attorney, Agent, or Firm* — Dority & Manning, P.A.

(57) ABSTRACT

A transmission parking lock has an actuating rod that is essentially translationally displaceable, which bears an actuating element, and with a locking lever that is essentially rotationally displaceable, bears a locking element For inserting the transmission parking lock through the displacement of the actuating rod, the locking lever is pivotable from a resting position of the same into a locked position in such a manner that the locking element engages in a recess of a gear wheel (8) allocated to a gear shaft, and with a device that withdraws the actuating element of the actuating rod in the resting position of the same from the locking lever.

1 Claim, 5 Drawing Sheets

(51) Int. Cl.
  *F16H 63/00* (2006.01)
  *B60T 1/00* (2006.01)
  *F16D 63/00* (2006.01)

(56) References Cited

U.S. PATENT DOCUMENTS

| | | | |
|---|---|---|---|
| 8,668,067 B2 * | 3/2014 | Morisawa et al. ......... 192/219.5 |
| 2005/0205384 A1 | 9/2005 | Reed et al. |
| 2011/0005891 A1 | 1/2011 | Hongawara et al. |

FOREIGN PATENT DOCUMENTS

| | | |
|---|---|---|
| DE | 10 2007 026412 | 12/2008 |
| DE | 10 2008 054467 | 6/2010 |
| DE | 10 2008 054469 | 6/2010 |
| JP | H111158 | 1/1999 |
| JP | 2007106327 | 4/2007 |

OTHER PUBLICATIONS

PCT Search Report and Written Opinion, Nov. 20, 2012.

* cited by examiner

TRANSMISSION PARKING LOCK

FIELD OF THE INVENTION

The invention relates generally for an automatic transmission to a transmission parking lock according.

BACKGROUND

The basic structure of a transmission parking lock for an automatic transmission is known from DE 36 36 978 C2. Accordingly, a transmission parking lock has an actuating rod that is essentially translationally displaceable, which is also designated as a push rod or a connecting rod, whereas the actuating rod bears an actuating element frequently designed as a cam. Moreover, a transmission parking lock has a locking lever that is essentially rotationally displaceable, which is frequently designated as a locking arm, whereas, for inserting the transmission parking lock through the translational displacement of the actuating rod, the locking lever is pivotable from a resting position of the same into a locked position, i.e. in such a manner that, in the locked position, a locking element of the locking lever engages in a recess of a gear wheel allocated to a gear shaft. In such a case, a rotation of the gear wheel and/or the gear shaft is then blocked by the locking lever. If the actuating rod is translationally displaced in an opposite direction, the locking element of the locking lever is able to release the gear wheel and/or gear shaft, in particular by the fact that the locking lever is pressed by a spring element back into the resting position.

With transmission parking locks known in the state of the art, the actuating element of the translationally displaceable actuating rod in the resting position of the same lies on a section of the locking lever if, in the transmission, for example, the driving position "D" is engaged for forward motion. If, for example the actuating rod, external or internal to the transmission, is excited by vibrations, an unwanted relative motion may form, on the one hand, between the actuating rod and the locking lever, namely the actuating element and the locking lever, and, on the other hand, between the locking lever and the drive gear, namely the locking element of the locking lever and the gear wheel. As a result, a ratchet (for example) between the locking lever and the gear wheel may be formed. This is detrimental.

SUMMARY OF THE INVENTION

On this basis, this invention is subject to the task of creating an innovative transmission parking lock. Additional objects and advantages of the invention will be set forth in part in the following description, or may be obvious from the description, or may be learned through practice of the invention.

The objects are achieved by a transmission parking lock according to embodiments claimed herein. The transmission parking lock in accordance with the invention comprises a device that withdraws the actuating element of the actuating rod in the resting position of the same from the locking lever.

In accordance with the invention, the actuating element of the actuating rod, in the resting position of the actuating rod, is withdrawn from the locking lever. This avoids the actuating element of the actuating rod, for example as a consequence of a vibrational excitation external or internal to the transmission, striking against the locking lever, and thus being able to cause a ratchet between the locking lever and the gear wheel. On the one hand, this avoids unwanted noise emissions in the transmission; and on the other hand, wear and tear to the parking lock caused by vibrations can be avoided, i.e., to such areas of components of the transmission parking lock that, with the transmission parking locks known from the state of the art, could strike against each other as a consequence of vibrations.

According to an advantageous additional form of the invention, the device that withdraws the actuating element of the actuating rod in the resting position of the same from the locking lever is designed as a finger of a notched disk of a mechanically shiftable transmission parking lock or as a finger of a parking disk of an electrically shiftable transmission parking lock.

According to an alternative additional form of the invention, the device that withdraws the actuating element of the actuating rod in the resting position of the same from the locking lever is designed as an element on the side of the transmission housing, on which the actuating rod in the resting position of the same lies either directly or indirectly across a bushing mounted on the actuating rod.

According to a further alternative additional form of the invention, the device that withdraws the actuating element of the actuating rod in the resting position of the same from the locking lever is formed from a contour of a guide bushing of the actuating element.

According to a further alternative additional form of the invention, the device that withdraws the actuating element of the actuating rod in the resting position of the same from the locking lever is designed as a spring element that engages, on the one hand, on a transmission housing and, on the other hand, on the actuating rod.

All of the aforementioned additional forms of the invention provide a relatively simple design implementation of the device, which withdraws the actuating element of the actuating rod in the resting position of the same from the locking lever. Such additional forms, in which the device is provided from an element on the side of the transmission housing, are particularly simple. However, other advantageous additional forms are also able to be implemented with relative simplicity in terms of design.

Preferred additional forms of the invention arise from the sub-claims and the following description.

BRIEF DESCRIPTION OF THE DRAWINGS

Embodiments of the invention are, without any limitation, more specifically described by means of the drawing. Thereby, the following is shown.

DETAILED DESCRIPTION

Figure 1A:
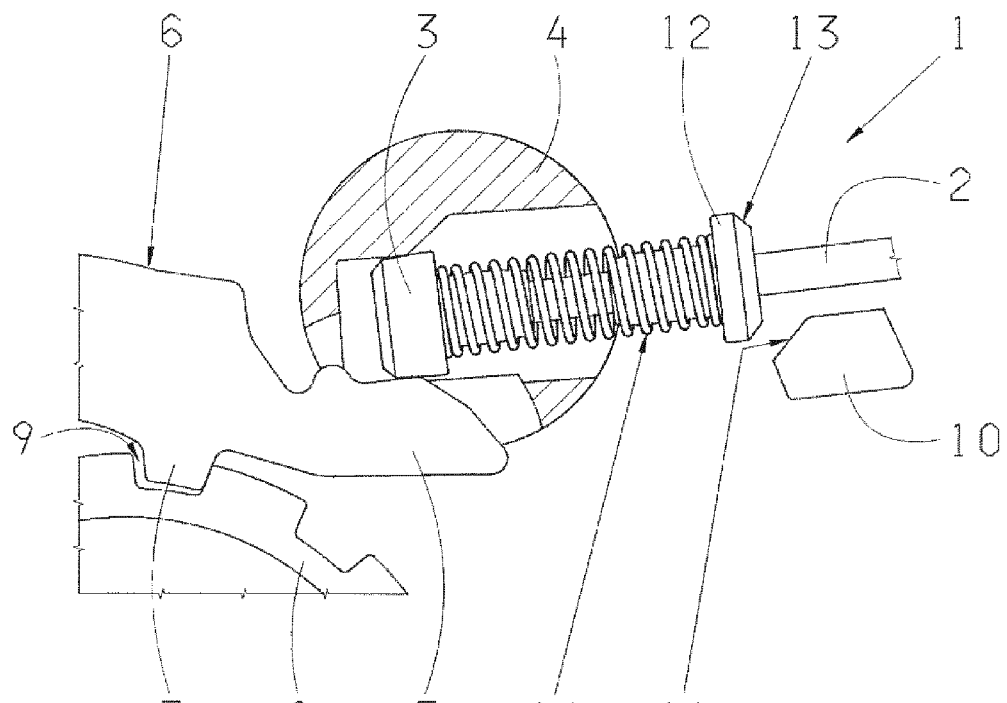
FIGS. 1a and 1b are sections from a first embodiment of a transmission parking lock in accordance with the invention, in partial cross-section, in two different states of the same.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1B:
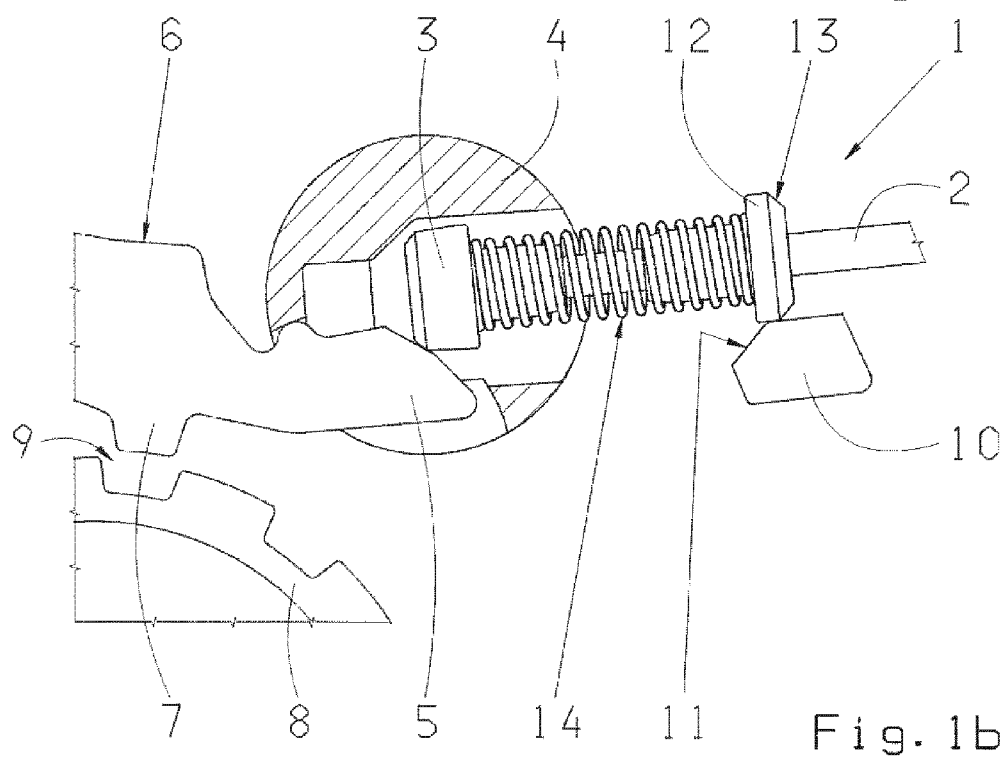

FIGS. 1a and 1b show a first embodiment of a transmission parking lock in accordance with the invention in two different positions, whereas, in FIG. 1a the transmission parking lock is engaged and accordingly blocks the transmission, while, in FIG. 1b the transmission parking lock is disengaged and releases the transmission.

FIGS. 1a and 1b show an actuating rod 2 that is essentially translationally displaceable from the transmission parking lock 1, which bears an actuating element 3 at one end. The actuating rod 2 is also designated as a connecting rod or a push rod. The actuating element 3, which may be designated as a cam or a cone, is guided into a guide bushing 4 and functions together with a section 5 of a locking lever 6. The locking lever 6 is also designated as a locking arm or a catch, and is essentially rotationally displaceable. The locking lever 6 bears a locking element 7, which, in a resting position (see FIG. 1b) of the transmission parking lock, releases a gear wheel allocated to a gear shaft and, in a locked position (see FIG. 1a), engages in a recess 9 of the gear wheel 8, and thus blocks the same.

Then, if the actuating rod 2 is transferred from the resting position shown in FIG. 1b into the locked position shown in FIG. 1a through translational displacement, the actuating element 3 functions together with the locking lever 6 in such a manner that the actuating element 3 pivots the locking lever 6 from the resting position shown in FIG. 1b into the locked position shown in FIG. 1a, and such that the locking element 7 of the locking lever 6 is brought into engagement with a recess 9 of the gear wheel 8.

However, if the actuating rod 2 is displaced in the opposite position, the actuating element 3 releases the locking lever 6, and the same may be displaced back into the resting position through the spring force of a spring element (not shown), whereas the locking element 7 is then led out from the recess 9 and releases the gear wheel 8.

In order to avoid, in the resting position of the parking lock, the actuating element 3 and thus the actuating rod 2 lying on the locking lever 6 and, as a consequence, a vibrational excitation external or internal to the transmission being able to cause a ratchet between the locking lever 6 and the gear wheel 8, the transmission parking lock in accordance with the invention has a device 10, which withdraws the actuating element 3 of the actuating rod 2 in the resting position (see FIG. 1b) of the transmission parking lock and/or the actuating rod 2 from the locking lever 6, i.e. the section 5 of the same.

In the embodiment of FIGS. 1a and 1b, this element 10, which withdraws the actuating element 3 of the actuating rod 2 in the resting position from the locking lever 6, is designed as an element on the side of the transmission housing 10, which, in the embodiment of FIGS. 1a and 1b, feature a ramp-like contour 11, which functions together with a bushing 12 mounted on the actuating rod 2, which has a conical contour 13. In the resting position (see FIG. 1b), the bushing 12 lies on the element on the side of the transmission housing 10, and thus the actuating element 3, which is mounted on the actuating rod 2 just like the bushing 12, is withdrawn from the locking lever 6, i.e., from the section 5 of the same. In the displacement of the actuating rod 2 from the locked position (see FIG. 1a) into the resting position (see FIG. 1b), the conical contour 13 of the bushing 12 travels along the ramp-like contour 11 of the element on the side of the housing 10, and thus the actuating element 3 withdraws from the locking lever 6. Accordingly, in FIGS. 1a and 1b, under an interim arrangement of the bushing 12 in the resting position, the actuating rod 2 lies indirectly on the element on the side of the transmission housing 10.

It can be seen from FIGS. 1a and 1b that both the actuating element 3 and the bushing 12 are mounted in an axially displaceable manner on the actuating rod 2 through a spring element 14, whereas, in accordance with FIGS. 1a and 1b, a common spring element 14 is allocated to the actuating element 3 and the bushing 12, which engages on the actuating element 3 at a first end and on the bushing 12 at a second end. The spring element 14 thus presses the actuating element 3 and the bushing 12 apart, whereas, however, both upon the displacement of the actuating rod 2 from the resting position shown in FIG. 1b into the locked position shown in FIG. 1a, and vice versa upon a displacement from the locked position shown in FIG. 1a into the resting position shown in FIG. 1b, on the one hand the actuating element 2 and on the other hand the bushing 12 are axially displaceable against the spring force of the spring element 14 to a certain extent.

Figure 2:
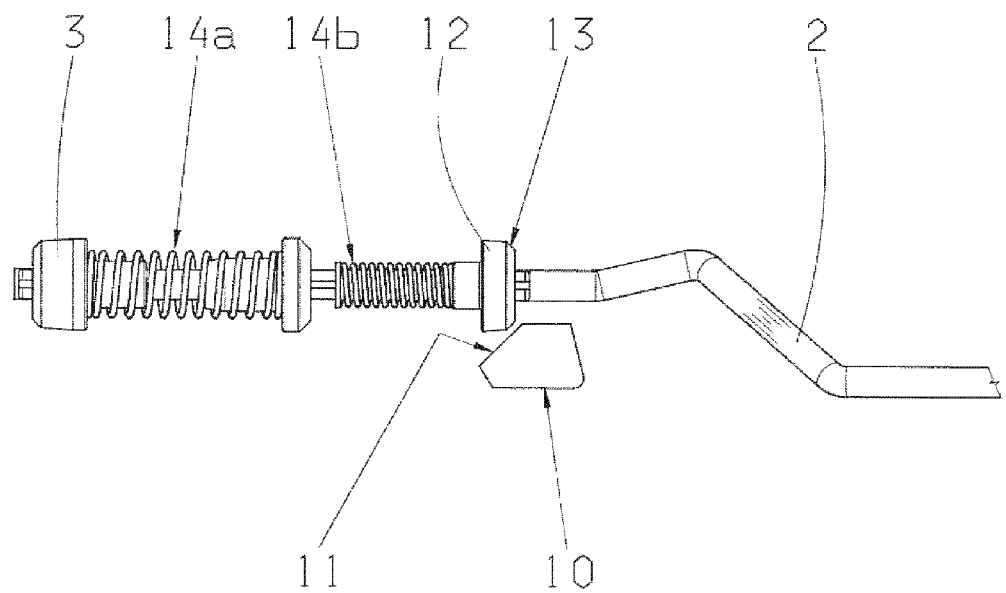
FIG. 2 is a section from a second embodiment of a transmission parking lock in accordance with the invention.

FIG. 2 shows a variant for the embodiment of FIGS. 1a and 1b, whereas, in the variant of FIG. 2, a separate spring element 14a or 14b, as the case may be, is allocated to each of the actuating element 3 and the bushing 12. Thus, the spring element 14a functions together with the actuating element 3, and the spring element 14b functions together with the bushing 12. Then, if a separate spring element 14a, 14b is allocated to each of the actuating element 3 and the bushing 12 for the mounting of the same on the actuating rod 2, the sensitivity of the transmission parking lock to factors influencing tolerance can be reduced.

Figure 3:
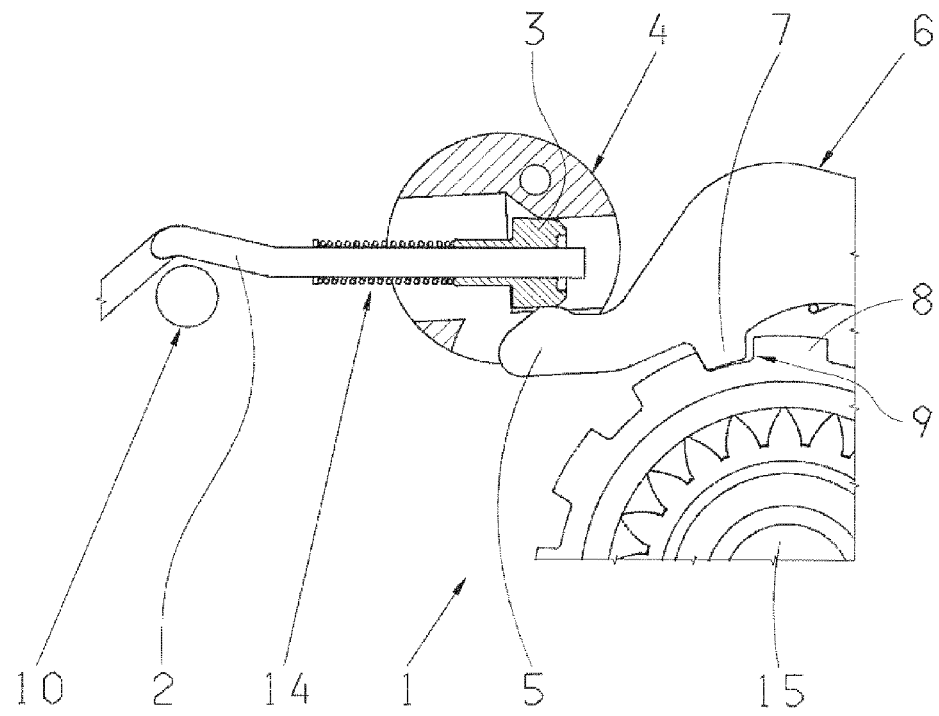
FIG. 3 is a section from a third embodiment of a transmission parking lock in accordance with the invention, in partial cross-section.

FIG. 3 shows a further embodiment of a transmission parking lock in accordance with the invention, whereas FIG. 3 shows the transmission parking lock in accordance with the invention in the locked position, in which the locking element 7 of the locking lever 6 engages in a recess 9 of a gear wheel 8 allocated to a gear shaft 15, and thus a rotation of the gear wheel 8 and the gear shaft 15 is blocked. The embodiment of FIG. 3 differs from the embodiment of FIGS. 1a and 1b solely by the fact that, in the embodiment of FIG. 3, the element on the side of the transmission housing 10, which withdraws the actuating element 3 of the actuating rod 2 in the resting position of the parking lock from the locking lever 6, is designed as a round bolt in the cross-section, which directly functions together with the actuating rod 2.

In the embodiment of FIG. 3, the bushing 12 of the embodiment of FIGS. 1a and 1b and of the embodiment of FIG. 2 need not be included. In the embodiment of FIG. 3, the actuating rod 2 in the resting position lies directly on the element on the side of the transmission housing 10, and thus withdraws the actuating element 3 from the locking lever 6.

Figure 4A:
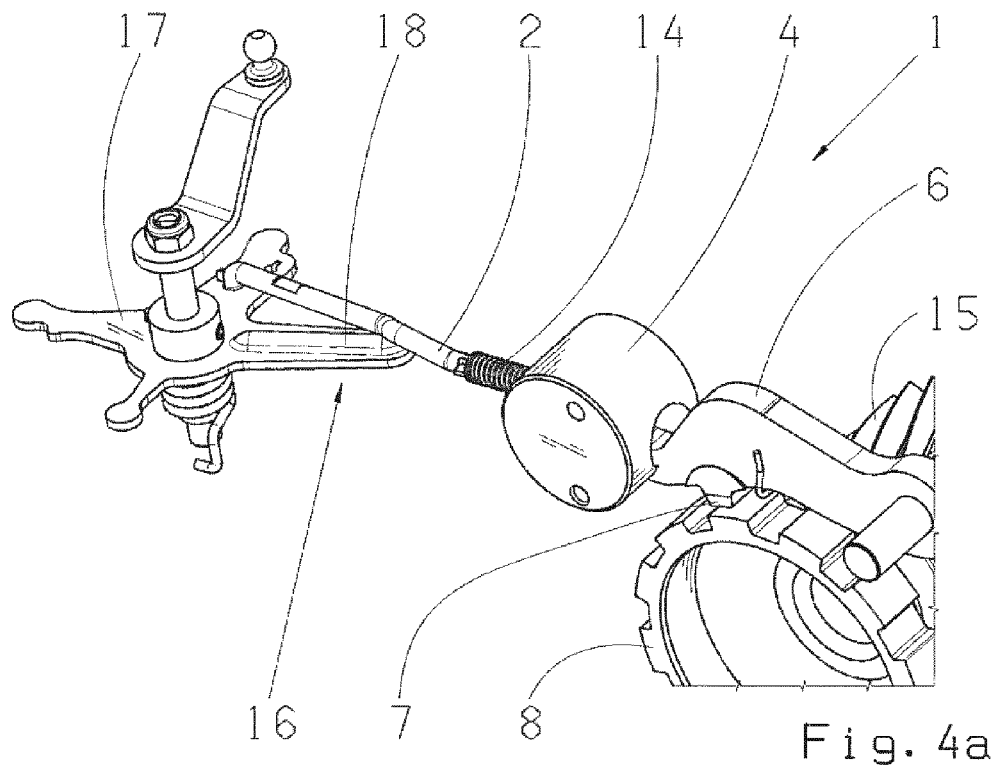
FIGS. 4a and 4b are sections from a fourth embodiment of a transmission parking lock in accordance with the invention, in two different states of the same.
Figure 4B:
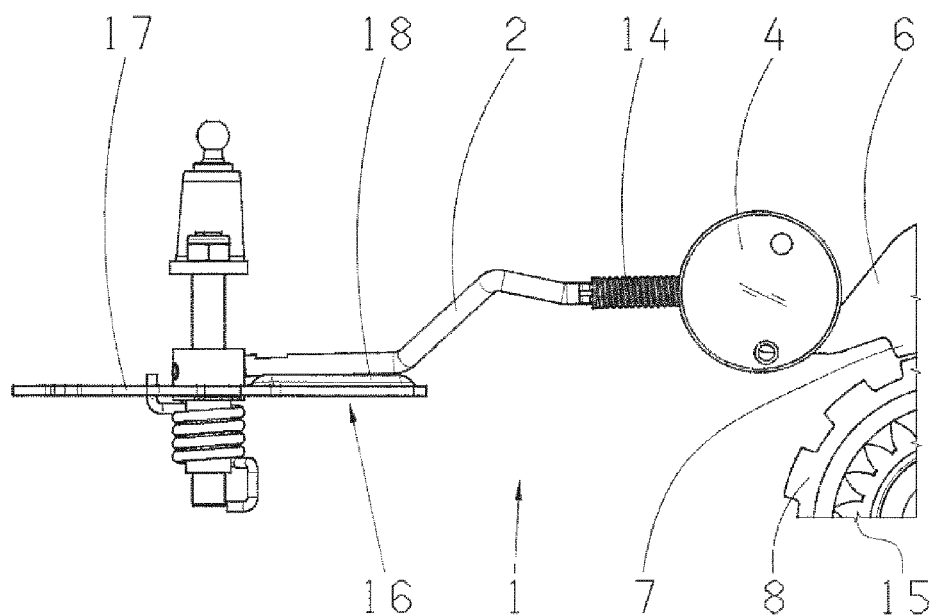

FIGS. 4a and 4b show an embodiment of a transmission parking lock 1 in accordance with the invention, in which the device, that withdraws the actuating element 3, covered in FIGS. 4a and 4b by the guide bushing 4, of the actuating rod 2 in the resting position from the locking lever 6, is designed as an additional arm and/or finger 16 of a notched disk 17 of a mechanically shiftable transmission lock or as an additional arm and/or finger of a parking disk of an electrically shiftable transmission lock. Details of such notched disks and/or parking disks of mechanically shiftable transmission locks and/or electrically shiftable transmission locks are familiar to the specialist addressed herein, and do not require any additional explanation.

In the embodiment of FIGS. 4a and 4b, such a notched disk 17 and/or parking disk has the additional finger 16, on which, in the resting position of the transmission parking lock shown in FIG. 4b, the actuating rod lies, and thus the actuating element 3 is withdrawn from the locking lever 6. This has, as can best be seen from FIG. 4b, the finger 16 through a bulge 18 or a projection, on which the actuating rod 2 in the resting position directly lies, i.e. under the withdrawal of the actuating element 3 of the actuating rod 2 from the locking lever 6.

Figure 5A:
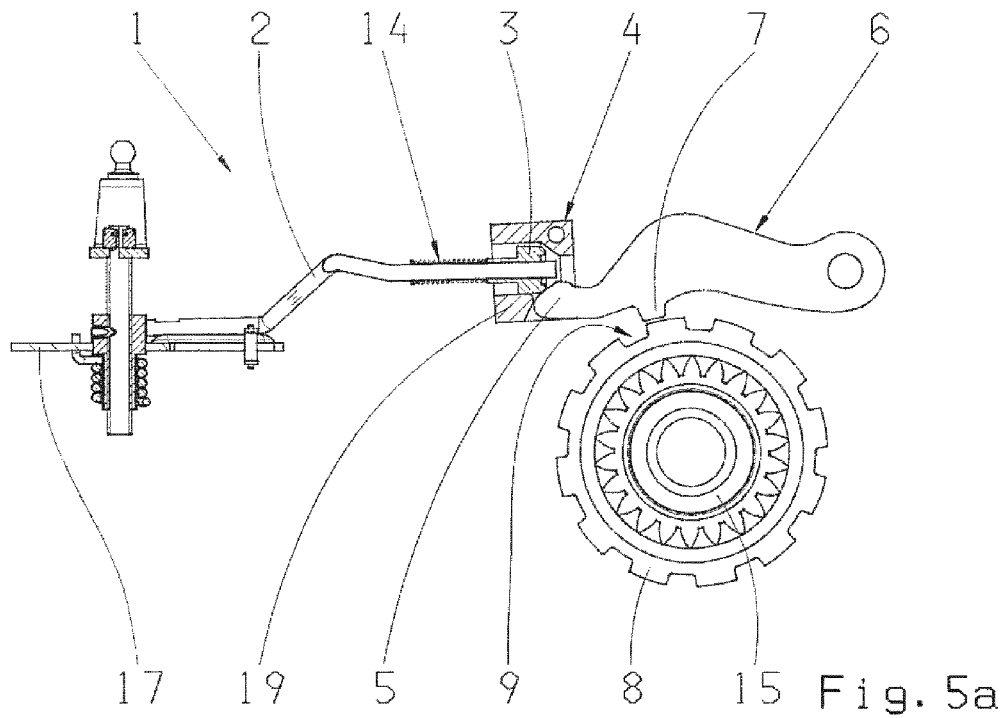
FIGS. 5a to 5c are details of a fifth embodiment of a transmission parking lock in accordance with the invention, in two different states of the same.
Figure 5B:
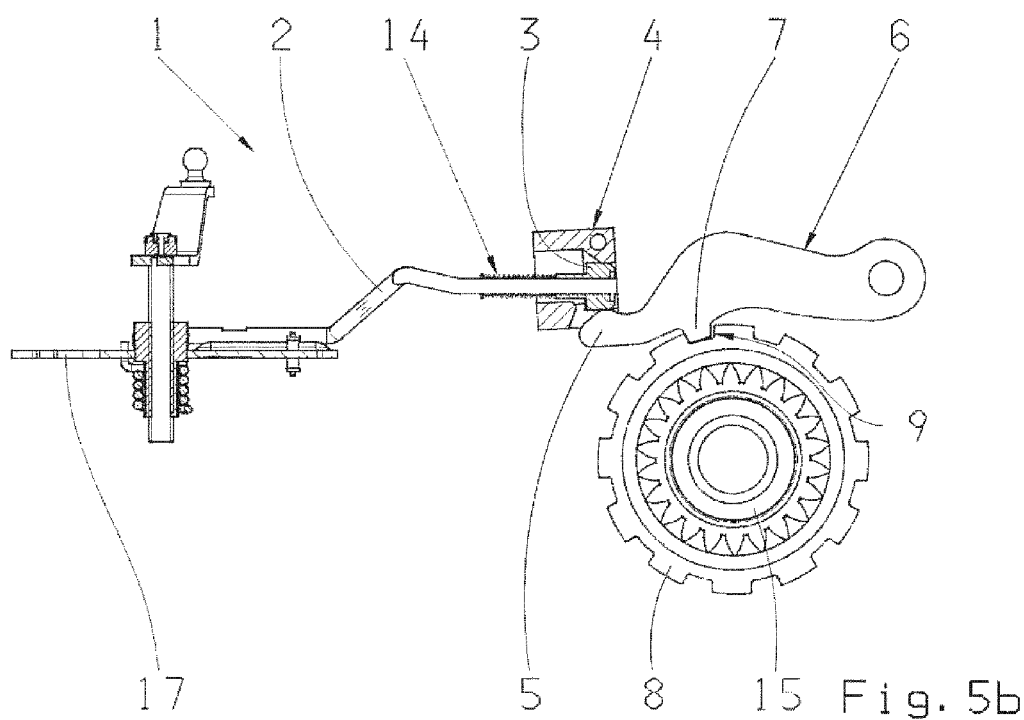
Figure 5C:
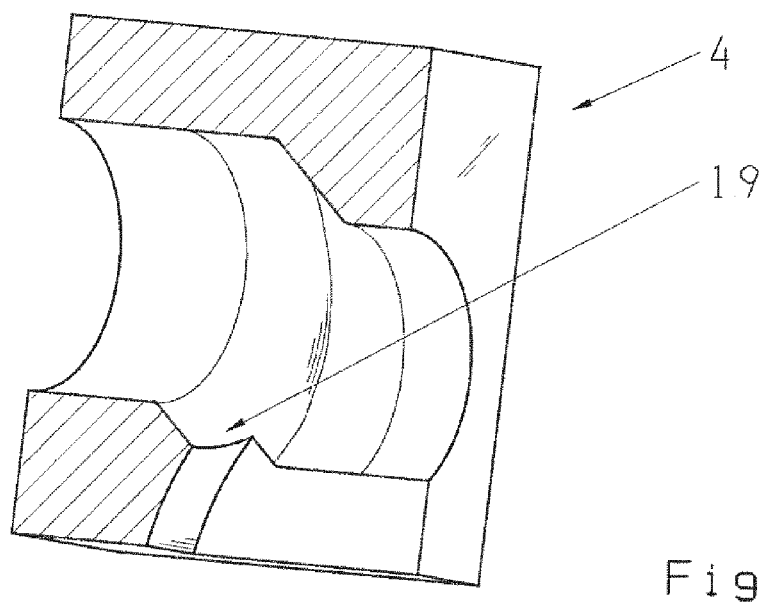

FIGS. 5a, 5b and 5c show an embodiment of a parking lock in accordance with the invention, for which the device, that withdraws the actuating element 3 of the actuating rod 2 in the resting position from the locking lever 6, is formed from a contour 19 of the guide bushing 4 of the actuating element 3. Such a contour 19 of the guide bushing 4 may be provided, for example, in a casting process under the use of a so-called "lost core."

Figure 6:
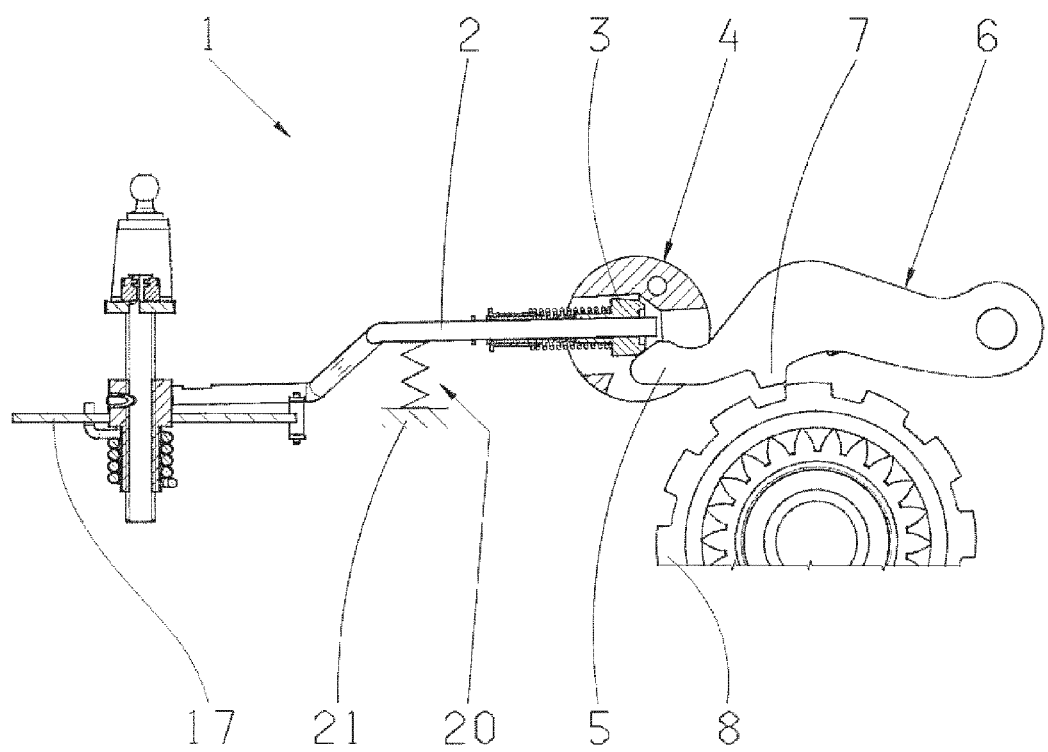
FIG. 6 is a section from a sixth embodiment of a transmission parking lock in accordance with the invention.

FIG. 6 shows a further embodiment of a parking lock 1 in accordance with the invention. In the embodiment of FIG. 6, the device, that withdraws the actuating element 3 of the actuating rod 2 in the resting position from the locking lever 6, is designed as a spring element 20, which engages, on the one hand, on the transmission housing 21 and, on the other hand, on the actuating rod 2. In the resting position of the transmission parking lock, the spring force of the spring element 20 presses the actuating element 3 away from the locking lever 6, such that the actuating element 3 is withdrawn from the section 5 of the locking lever 6.

With all embodiments, it can be simply and reliably guaranteed that, if the transmission parking lock 1 is designed and accordingly found in a resting position, an actuating element 3 mounted on the actuating rod 2 is withdrawn from the locking lever 6. Thereby, even if there is a vibrational excitation of the actuating rod 2 external or internal to the transmission, a striking together of the actuating element 3 and of the locking lever 6, and thus of the locking lever 6 and the gear wheel 8, is avoided, such that no ratchet may occur. This avoids both unwanted noise emissions and increased wear and tear as a result of vibrations.

Modifications and variations can be made to the embodiments illustrated or described herein without departing from the scope and spirit of the invention as set forth in the appended claims.

The invention claimed is:

1. A parking lock for a vehicle transmission, comprising:
an actuating rod with an actuating element configured thereon, the actuating rod displaceable in a translational direction;
a rotationally displaceable locking lever having a locking element configured thereon, the locking element pivotable upon displacement and contact with the actuating element from a locked position where the locking element engages in a recess of a gear wheel to set the parking lock in a first translational position of the actuating rod and actuating element to a resting position wherein the locking element is disengaged from the recess of the gear wheel in a second translational position of the actuating rod and actuating element; and
a withdrawal device disposed relative to the translational displacement direction of the actuating rod so as to contact the actuating rod or actuating element and move the actuating element in a direction transverse to the translational displacement direction so as to lift and withdraw the actuating element from the locking lever upon displacement of the actuating rod in the translational displacement direction between the first translational position and the second translational position,
wherein the parking lock is one of a mechanically or electrically shiftable transmission parking lock, the withdrawal device comprising a notched disk having first finger and a second finger, the actuating rod coupled to the withdrawal device at the first finger of the notched disk, the second finger of the notched disk having a projection, the projection of the second finger positioned such that the actuating rod engages the projection of the second finger in the resting position of the locking lever.

* * * * *